United States Patent [19]
Delory et al.

[11] Patent Number: 5,123,111
[45] Date of Patent: Jun. 16, 1992

[54] CELLULAR RADIOTELEPHONE SYSTEM, A METHOD OF PROTECTING THE DATA BASE OF A VISITOR LOCATION REGISTER AGAINST SATURATION

[75] Inventors: Jean-Michel Delory, Levis St Nom; Pascal Treillard, Paris, both of France

[73] Assignee: Alcatel Cit, Paris, France

[21] Appl. No.: 642,943

[22] Filed: Jan. 18, 1991

[30] Foreign Application Priority Data

Jan. 19, 1990 [FR] France .................................. 90 00616

[51] Int. Cl.$^5$ ...................... H04Q 7/00; H04M 11/00
[52] U.S. Cl. ...................................... 455/34.1; 379/60
[58] Field of Search ....................... 455/33, 54, 34, 38; 379/69, 60

[56] References Cited

U.S. PATENT DOCUMENTS

| | | | |
|---|---|---|---|
| 4,893,327 | 1/1990 | Stern et al. ............................. | 455/33 |
| 4,894,856 | 1/1990 | Nakanishi ............................... | 455/34 |

FOREIGN PATENT DOCUMENTS 0260763 3/1988 European Pat. Off. .
WO8808238 10/1988 PCT Int'l Appl. .

OTHER PUBLICATIONS

8th European Conference on Electronics Eurocon, Jun. 1988, Stockholm, Sweden, pp. 462–464; J. A. Audestad: "Network Aspects of the GSM System".

Primary Examiner—Curtis Kuntz
Assistant Examiner—Christine K. Belzer
Attorney, Agent, or Firm—Sughrue, Mion, Zinn, Macpeak & Seas

[57] ABSTRACT

In a cellular radiotelephone system, the data base of a visitor location register is protected from saturation by releasing n-tuplets from the data base corresponding to those temporary mobile identity words corresponding to mobiles which announced their presence more than some predetermined time earlier, and by changing the predetermined time when the register nears saturation.

6 Claims, 5 Drawing Sheets

CELLULAR RADIOTELEPHONE SYSTEM, A METHOD OF PROTECTING THE DATA BASE OF A VISITOR LOCATION REGISTER AGAINST SATURATION

BACKGROUND OF THE INVENTION

The invention relates to a method for use in a cellular radiotelephone system to protect the data base of a visitor location register against saturation.

The Special Mobile Group (GSM) of the European Conference of Post and Telecommunications Administrations has laid down standards for implementing a European digital cellular radiotelephone system. This system includes a radio subsystem constituted by: mobile stations providing mobile subscribers with access to telecommunications services; base stations; and base station controllers. The system also includes another subsystem constituted by: mobile service switching centers; home location registers; visitor location registers; and operation and maintenance centers.

A base station provides radio transmission and control of the low layers of the signalling channels. A base station controller controls one or more base stations and acts as a bridge between base stations and a mobile service switching center. It manages radio resources and it performs preprocessing that enables the mobile service switching center to be made less specific to the "mobile radiotelephone" application, compared with a conventional telephone switching center.

A mobile service switching center enables the cellular radiotelephone system to interwork with fixed telecommunications networks, either directly or else via an interworking unit. Radio coverage of a territory is obtained by juxtaposing zones comprising one or more cells, each cell being served by a base station. A mobile service switching center handles the calls of mobile subscribers situated in one or more zones. These functions include certain features specific to the mobile nature of the subscribers, and in particular managing the automatic handover of calls from one cell to another. It also has another major difference compared with an exchange in a fixed telecommunications network: it does not have its own data concerning the mobile subscribers present in its location zones nor does it perform the associated management.

This management is performed by an entity called the visitor location register (VLR), with data concerning these mobiles being handed over from a central entity referred to as the home location register (HLR). A moving mobile subscriber passes successively from one location zone to another. Subscriber displacement is signalled automatically by the moving equipment to the base stations which inform the VLR supervising the corresponding location zones.

The term "in-booking" is used herein to designate the procedure whereby a VLR recovers data from the HLR concerning a mobile subscriber unknown thereto, with this procedure marking the arrival of the mobile subscriber in a location zone supervised by the VLR. The term "out-booking" is used herein to designate the procedure whereby a VLR releases the resources that it had previously allocated to a subscriber when the subscriber leaves the zones belonging to the VLR, and after this event has been notified by the HLR. The term "updating the internal location" is used herein to designate the procedure whereby a VLR updates information relating to the location zone of a mobile known thereto, and which marks a subscriber moving from one of the zones supervised by the VLR to another.

The in-booking procedure consists essentially in: authenticating the mobile and obtaining data from the HLR describing the subscription of the mobile. The HLR has two main functions: it constitutes the reference data base for the cellular radiotelephone system; and it keeps track continuously of the location of the mobile subscribers to enable incoming calls to be directed to them. In a national network there may be one or more HLRs. In a cellular radiotelephone system, mobile subscribers are identified by: a directory number enabling them to be called from another subscriber in the fixed network or from another mobile subscriber, and by a permanent international mobile station identity (IMSI) which is allocated to the equipment of the mobile station and which is used on the fixed network and possibly also on the radio segment.

In order to be able to guarantee that the international identity remains confidential, the VLR allocates a temporary mobile station identity (TMSI) to each subscriber, with the TMSI being used as often as possible on the radio segment instead of the IMSI. The GSM specifications define the way in which the various identities of the mobile subscriber should be used during various procedures.

The data base of an HLR contains the description of all of the mobile subscribers under its control. This data base is managed by a real time data management system (SGDTR) which provides quick access to data. The data in the data base is organized in the form of two-dimensional tables. Each row of a table (also known as an n-tuplet) is allocated to a different subscriber, and each column contains a particular type of information describing subscribers, for example information concerning a service to which they may subscribe. The intersection of a row and a column thus corresponds to a particular item of information relating to one subscriber.

For each mobile subscriber, the data base of an HLR contains:
 the national directory number;
 the list of services subscribed-to;
 the international identity or IMSI;
 location, i.e. the identity of the VLR supervising the zone in which the subscriber is present; and
 data enabling the mobile to be authenticated, which data is referred to below as authentication triplets.

The data base of an HLR is updated: whenever a subscription is opened, altered, or cancelled by the network operator; whenever a subscriber alters one of the services subscribed to, e.g. a call transfer number; whenever a subscriber changes VLR; and whenever new authentication triplets need to be calculated. The SGDTR serves to define access keys for each table. The IMSI and the directory number are the access keys to subscriber data. When an n-tuplet is allocated, the SGDTR provides the number of this n-tuplet which is an internal reference for the data base enabling the data to be accessed more quickly than when using an access key such as the IMSI.

Each VLR also has its own data base controlled by the same real time data control system SGDTR. This data base contains data describing mobile subscribers currently located in any one of the location zones supervised by the VLR, and mainly constituted by:
 the national directory number;
 the list of services subscribed to;

the international identity IMSI;
the temporary identity, TMSI;
the location zone; and
the authentication triplets.

The subscriber number, the international identity IMSI, and the temporary identity TMSI are access keys to the subscriber data in the VLR data base.

Changes in the VLR data base are very frequent since it is altered each time there is in-booking, out-booking, an internal location update, a subscription data update concerning mobile subscribers in the VLR, or a renewal of authentication triplets. The in-booking procedure requires the SGDTR to allocate n-tuplets in the various tables storing information describing subscribers, and the out-booking procedures requires all of these n-tuplets to be released. The data describing the mobile is received either from the VLR which was supervising it previously (authentication triplets), or else from the HLR (all data). The in-booking procedure includes informing the HLR of the new location of the mobile.

The SGDTR manages tables of fixed size only. It is therefore not possible to allocate a number of n-tuplets which is greater than the size of the table. For the HLR, this does not constitute a constraint since the number of subscribers is under the control of the network operator. However, for a VLR which manages subscribers that are mobile by definition, it is necessary to be able to take account of the following constraints:

as soon as a mobile is booked into a VLR, the VLR allocates it an n-tuplet in its data base; and
this data is of use only if the mobile requires attention either by moving or else by making a call.

Patent application EP-A-0 260 763 describes a method of managing the data base of a visitor location register by storing words in said data base in association with each mobile subscriber to identify one or more geographical zones in which the subscriber has recently required attention. Each zone-identifying word is accompanied by another word specifying the time at which the mobile station required attention in said zone. The probability of the subscriber being present in each of these zones is estimated by comparing the times that have elapsed since the most recent calls concerning the subscriber that have taken place in respective ones of the zones. A word identifying a zone in association with a subscriber is deleted from the data base of the visitor location register whenever said subscriber has neither made nor received a call in said zone over a predetermined length of time. This length of time is made longer whenever only one zone-identifying word remains stored in the data base. A subscriber no longer present in any of the zones served by the register under consideration thus ceases to occupy space in said data base once a certain length of time has elapsed. There nevertheless remains a risk that the data base will saturate.

At peak times, it may happen that the number of mobile subscribers present in the location zones of the VLR exceeds the capacity of the VLR. In this case, the VLR can either: refuse to book new mobiles in; or else it can unilaterally book out mobiles that have not required attention for a certain length of time.

It is always possible for the VLR to retrieve data from the HLR concerning a subscriber that it has been out-booked, but only at the cost of a procedure which is expensive in computation time, and that is to be avoided when operating at full load.

A VLR may suffer partial or total breakdown, which leads to the need to be able to re-establish subscriber data as and when subscribers require attention by means of a procedure referred to as "restoring" the VLR.

SUMMARY OF THE INVENTION

An object of the invention is to provide a method of protecting the data base of a visitor location register so as to enable the visitor location register to operate at its saturation limit without giving rise to disturbances observable by the mobile subscribers and while maintaining traffic close to the maximum. The invention takes account of the normal risk of data base saturation as mentioned above; it also takes account of the additional risk that results from the fact that a mobile subscriber may leave the zone served by a VLR but without the VLR being informed, due either to an error or to a malfunction. In addition, the invention takes account of the risk of two subscribers being confused that arises because of a mobile being booked out unilaterally for the purpose of reusing the subscriber's temporary identity, or because the VLR is being restored.

The method of the invention consists, in particular, in giving each subscriber a time mark, and in recording the time mark with the subscriber data in the VLR data base. In order to enable the time mark to be recorded in the data base, it is integrated in the temporary mobile station identity TMSI which the VLR allocates to the subscriber and which is recorded in the subscriber n-tuplet.

The structure of the binary word constituting a temporary identity for a mobile subscriber is defined in part by GSM Recommendation No. 03.03 version 3.2.1. This recommendation specifies that the binary word must not comprise more than four 8-bit bytes, but that its structure may be freely selected by each administration to satisfy local needs. In order to avoid allocating the same temporary identity to two mobile subscribers after the visitor location register has been restored, the recommendation suggests that a portion of the binary word should be a function of the time at which it is allocated, or else that it should include a field which is modified when the visitor location recorder is restored. No provision is made for a method to protect the data bases of VLRs against saturation and enabling the above-mentioned problem to be taken into account.

The present invention provides a a cellular radiotelephone system, a method of protecting the data base of a visitor location register from saturation, the method consisting in:

allocating a temporary mobile identity word to each mobile that announces its presence for the first time in a geographical zone served by the register, said word comprising a first field specifying an internal reference for an n-tuplet in a table of the data base, and a second field which is a function of the instant at which the temporary identity word is allocated;

writing each temporary identity word in the n-tuplet designated by its first field;

releasing said n-tuplet when the mobile demonstrates its presence in a zone corresponding to another register;

allocating a new temporary identity word to a mobile each time said mobile again announces its presence in a zone served by the register after a silence of duration greater than a threshold value, with the first field thereof remaining unchanged while the second field thereof being a function of the instant at which the mobile again announces its presence;

writing the new temporary identity word in the n-tuplet designated by the first field; and periodically releasing from the data base those n-tuplets which correspond to temporary identity words whose second fields correspond to instants earlier than a first threshold instant;

the method being characterized in that it further consists, whenever the data base is filled close to saturation, in releasing n-tuplets from the data base corresponding to temporary identity words whose second fields correspond to instants earlier than a second threshold instant which is more recent than the first threshold instant.

A routine procedure thus serves to find and release n-tuplets in the data base which are occupied by data concerning mobiles that have not required attention for a long time. In order to measure the length of time for which a mobile has not required attention, method consists in providing a time mark within the data stored in each n-tuplet, which mark is a function of the most recent occasion on which the mobile required attention. This time mark is integrated in the temporary identity word which is stored in the n-tuplet. Since this temporary identity word is used for setting up calls between the mobile and the VLR, the time mark also serves to avoid confusion between two mobiles which have in succession had the same n-tuplet for storing their data.

The method of the invention also consists in releasing those n-tuplets in the data base that correspond to slightly more recent temporary identities in the event that the routine procedure does not suffice.

BRIEF DESCRIPTION OF THE DRAWINGS

The invention will be better understood and other details will appear from the following description and the accompanying figures.

DETAILED DESCRIPTION OF THE PREFERRED EMBODIMENT

Figure 1:
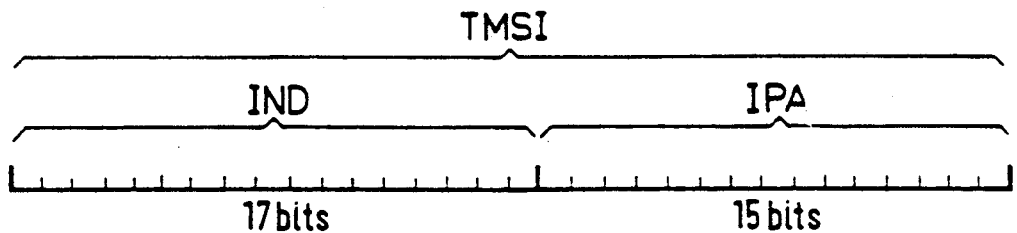
FIGS. 1 and 2 show two examples of temporary identity word formats for mobiles and suitable for implementing the method of the invention.

FIG. 1 shows the format of a binary word referenced TMSI suitable for use in one implementation of the method of the invention. The word comprises a field referenced IND which contains the internal reference of the n-tuplet containing the data belonging to the mobile; and a field referenced IPA which contains a time mark. The field IND occupies 17 bits and the field IPA occupies 15 bits. The 17 bits of the field IND enable up to 128,000 mobiles to be addressed in a VLR. The time mark is the result of counting time periods modulo $2^{15}$. It enables $2^{15}$ time periods to be distinguished.

In a variant of the method of the invention, the method further consists in saving the result of the count and in incrementing it by unity each time the VLR suffers an accident causing it to be deleted in part or completely.

Although the total number of bits in both fields is laid down, splitting them up into a 17 bit field and a 15 bit field is given here purely by way of example. It would be quite possible to use a different split, e.g. 18 bits and 14 bits, thereby making it possible to provide VLRs having a capacity of 256,000 mobiles.

In a variant of the method of the invention, the method further consists in providing a mark in the temporary identity word indicating that the state of the register has been restored, and in incrementing this mark each time the visitor location register suffers an accident causing its memory to be deleted totally or in part.

Figure 2:
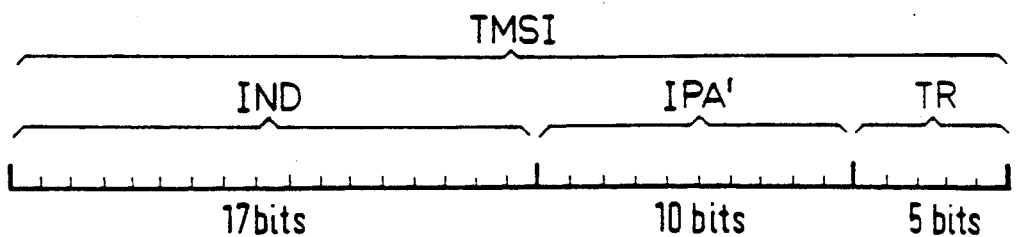

FIG. 2 shows another possible format for the temporary identity word TMSI allocated to a mobile. In this format, an n-tuplet number IND is encoded on 17 bits, a time mark IPA' is encoded on 10 bits, and a restored mark IR is encoded on 5 bits. The time mark IPA' is merely the result of counting time periods modulo $2^{10}$.

The mark TR is the result of counting occasions on which the recorder is restored, modulo $2^5$. This format has the advantage of clearly distinguishing changes in temporary identity due to time elapsing and changes in temporary identity due to the state of the recorder being restored. However, this format suffers from the drawback of reducing the number of values that the time mark can take up since it can only occupy values in the range 0 to $2^{10}-1$.

In a preferred implementation, the field IPA or IPA' used to indicate the time at which allocation took place is incremented regularly, once every 30 minutes, thereby enabling a 15-bit time mark to allocate different temporary identities over a cycle having a duration close to two years. It thus makes it possible to detect temporary identities which correspond to mobiles that do not require attention for long periods of time, providing a procedure is available for refreshing the temporary identity of a mobile each time that mobile requires attention in one of the zones served by the VLR under consideration.

In another variant of the method of the invention, the allocation time periods may be variable duration such that the number of temporary identities allocated to mobiles in each period is equal to a fixed maximum value. In this way, releasing the TMSIs of a given time period serves to release a substantially constant number of identities even though variations in traffic cause the recorder to allocate varying numbers of temporary identities per unit time. This variant of the method of the invention (variable duration allocation periods) is equally applicable to the method which consists in providing TMSIs constituted by three fields: IND, IPA', and IR; or constituted by two fields: IND, IDA.

When using allocation periods of variable duration, it may be observed that it is preferable to keep constant the number of periods allocated in a given length of time, e.g. 24 hours, so as to preserve the time meaning of the IPA field in the TMSI.

When the data base of a VLR is far from saturation, the normal procedure for managing n-tuplets is as follows. When a VLR books a mobile in, it reserves an available n-tuplet in the data base for the mobile and allocates a TMSI to the mobile, which TMSI contains:

an internal reference in the field IND and designating the n-tuplet in question within the data base; and a current value in the field IPA for attribution to the time mark. When a mobile leaves the VLR, then the VLR releases the corresponding n-tuplet in its data base, together with the TMSI.

A procedure is run periodically for unilaterally releasing n-tuplets from the data base (i.e. releasing them without informing the mobiles concerned), with the n-tuplets that are released being those that have the oldest time marks. The corresponding TMSIs are thus also released. This "garbage collection" is intended to protect the system against the above-described risks of saturating.

Assuming that the time mark is incremented once every half hour, it has a period of two years, and those TMSIs which are released unilaterally will be at least one year old, for example. It is extremely unlikely that a mobile that has not required attention for one year will requires attention in the future. However, should that happen, the VLR will detect an anomaly since the internal reference of the data base will correspond either to a free n-tuplet or else to an n-tuplet containing a TMSI allocated during a time period other than that of the TMSI sent by the mobile.

The value to be given to the time mark is backed-up in mass memory each time it has been incremented. In the event of the VLR suffering an accident, the value to be given to the mark is restored, and is incremented by unity, thereby shortening the duration of the current period, and thus making it possible to distinguish temporary identities allocated after restoration from those allocated before restoration.

Figure 3:
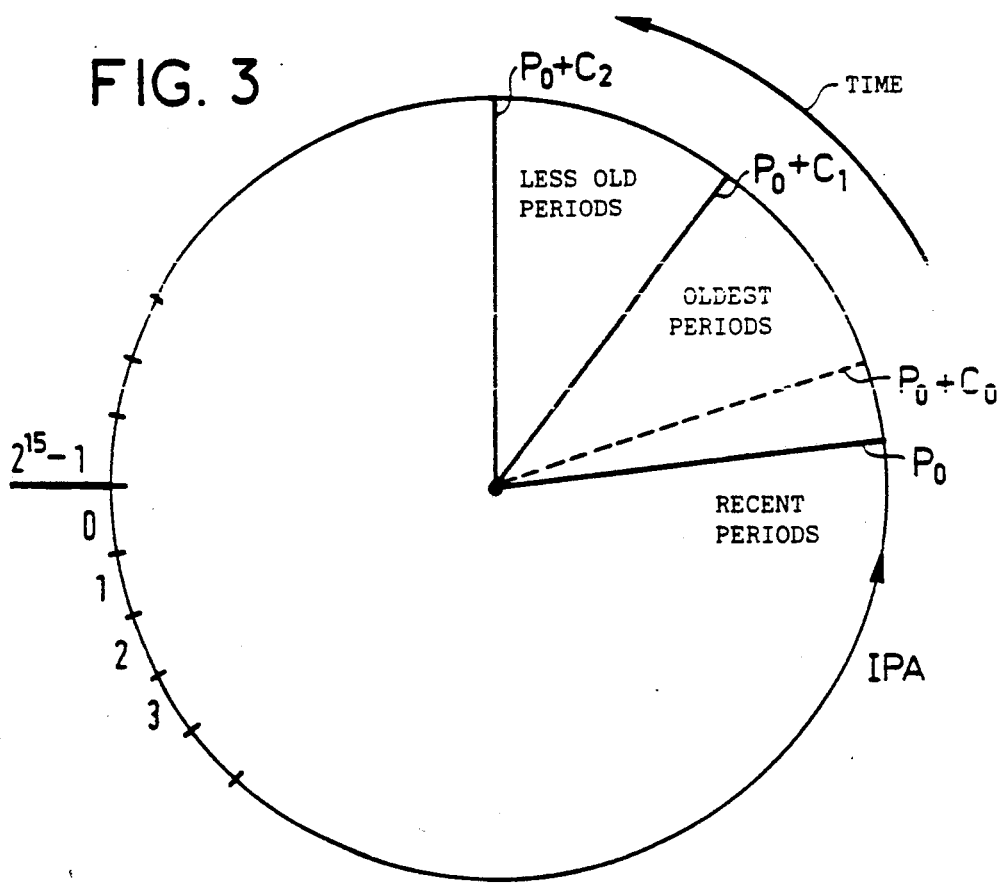
FIG. 3 shows one example of how the method may be implemented.

FIG. 3 shows how time mark values are given over a period of time. The mark takes up all of the values in the range 0 to $2^{15}-1$ in succession. At an instant under consideration, the mark has a value $P_0$. Because of the cyclic nature of the way in which values are given to the time mark IPA, the oldest time marks are those belonging to the range $P_0$ to $P_0+C_0$ modulo $2^{15}$.

The VLR periodically runs a routine procedure consisting in deleting from its memory data corresponding to temporary identity words having an IPA mark whose value lies in the range $P_0+C_0$ to $P_0+C_1$, modulo $2^{15}$. These values correspond to the oldest temporary identities. The constant $C_0$ is a safety margin of not less than unity, and the constant $C_1$ is equal to several units. $C_1$ defines a first threshold instant.

Figure 4:
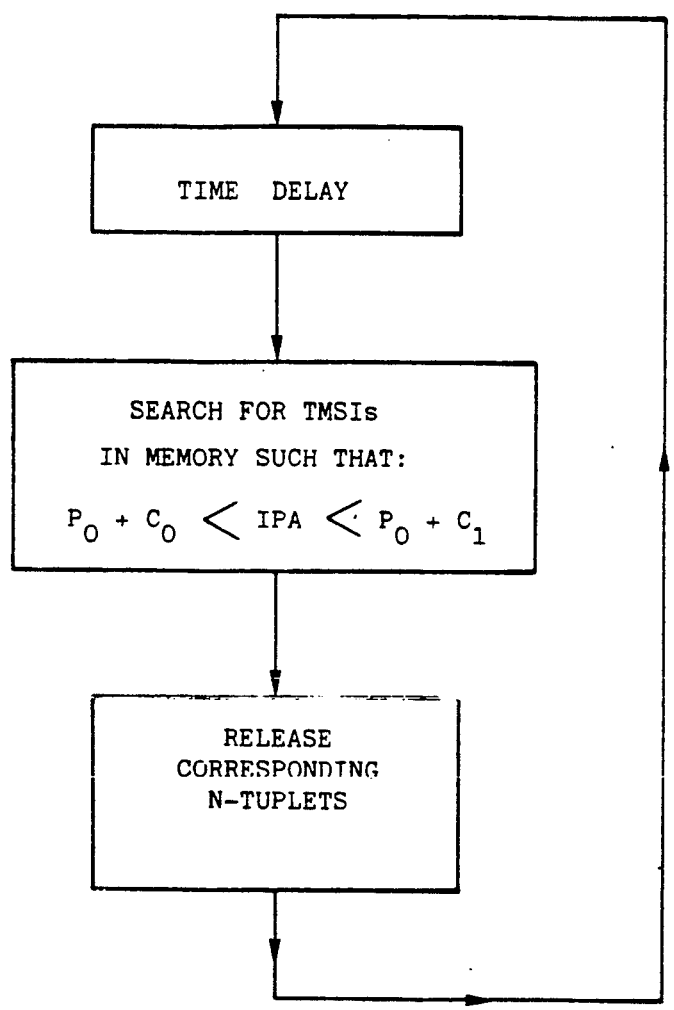
FIG. 4 is a flow chart of an example of how the method of the invention may be implemented to release n-tuplets periodically by a routine procedure.

FIG. 4 is a flow chart showing one example of how the method of the invention may be implemented to periodically release n-tuplets corresponding to those TMSIs which have the oldest IPA fields. This procedure begins with a time delay which defines the period between two successive applications of the procedure. The duration of the time delay may be equal, for example, to one half the duration of the period of the time mark. Once the time delay has elapsed, the procedure consists in searching for TMSIs in which the value of the IPA mark lies between $P_0+C_1$ modulo $2^{15}$ and $P_0+C_0$ modulo $2^{15}$. Thereafter it releases them and restarts the time delay.

Figure 5:
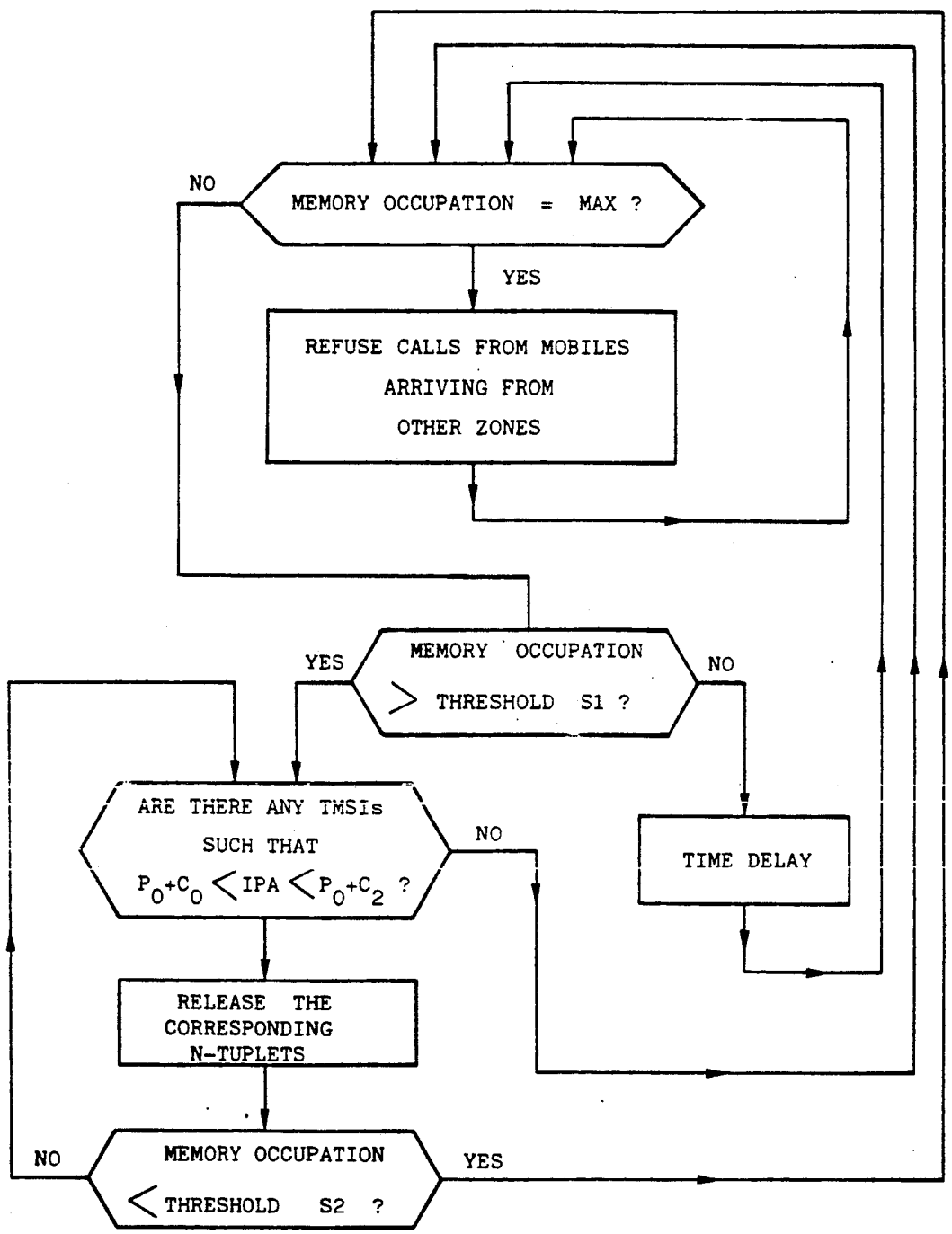
FIG. 5 is a flow chart showing one example of how the method of the invention may be implemented to release n-tuplets by an emergency procedure.

FIG. 5 is a flow chart of one way of implementing the method of the invention to release n-tuplets corresponding to more recent TMSIs when the data base is filled close to saturation. The first step of the procedure consists in comparing the value of memory occupation with a maximum value MAX which corresponds to saturation. If the occupation value is equal to its maximum value, then the procedure consists in refusing calls from new mobiles coming from zones that are not served by the register under consideration and in returning to the first step of the procedure to see if memory occupation is still at its maximum value.

If the memory occupation value is not at its maximum, it is compared with a threshold value S1 which is less than the maximum value but is nevertheless close to saturation, e.g. 95%.

If the memory occupation value is less than the threshold S1, the procedure consists in running a time delay and then returning to the first step of the procedure.

If the memory occupation value is not less than the threshold S1, then the procedure consists in searching for n-tuplets corresponding to TMSIs having time marks lying between $P_0+C_1$ modulo $2^{15}$ of $P_0+C_2$ modulo $2^{15}$.

If there are none, the procedure then consists in returning to the first step in which the memory occupation value is compared with the maximum value.

If there are some, then the procedure consists in releasing the corresponding n-tuplets and then in comparing the memory occupation value with a second threshold value S2 which is less than S1, e.g. S2 equals 80%. If memory occupation is less than S2, then the procedure consists in returning to the first step. Otherwise, the procedure consists in performing a new search for n-tuplets having TMSIs with time marks lying between $P_0+C_1$ modulo $2^{15}$ and $P_0+C_2$ modulo $2^{15}$. Stopping the emergency procedure on TMSIs having a time mark equal to $P_0+C_2$ modulo $2^{15}$ is justified by the fact that there is a high probability that mobiles unilaterally booked out by the VLR will require attention again in the future, e.g. by changing location zone. Under such circumstances, with the VLR receiving a TMSI that no longer exists in its data base, the VLR must authenticate the mobile and then re-request its characteristics from the HLR. This task is clearly extra to current traffic tasks and such overloading of the VLR should be avoided.

Figure 6A:
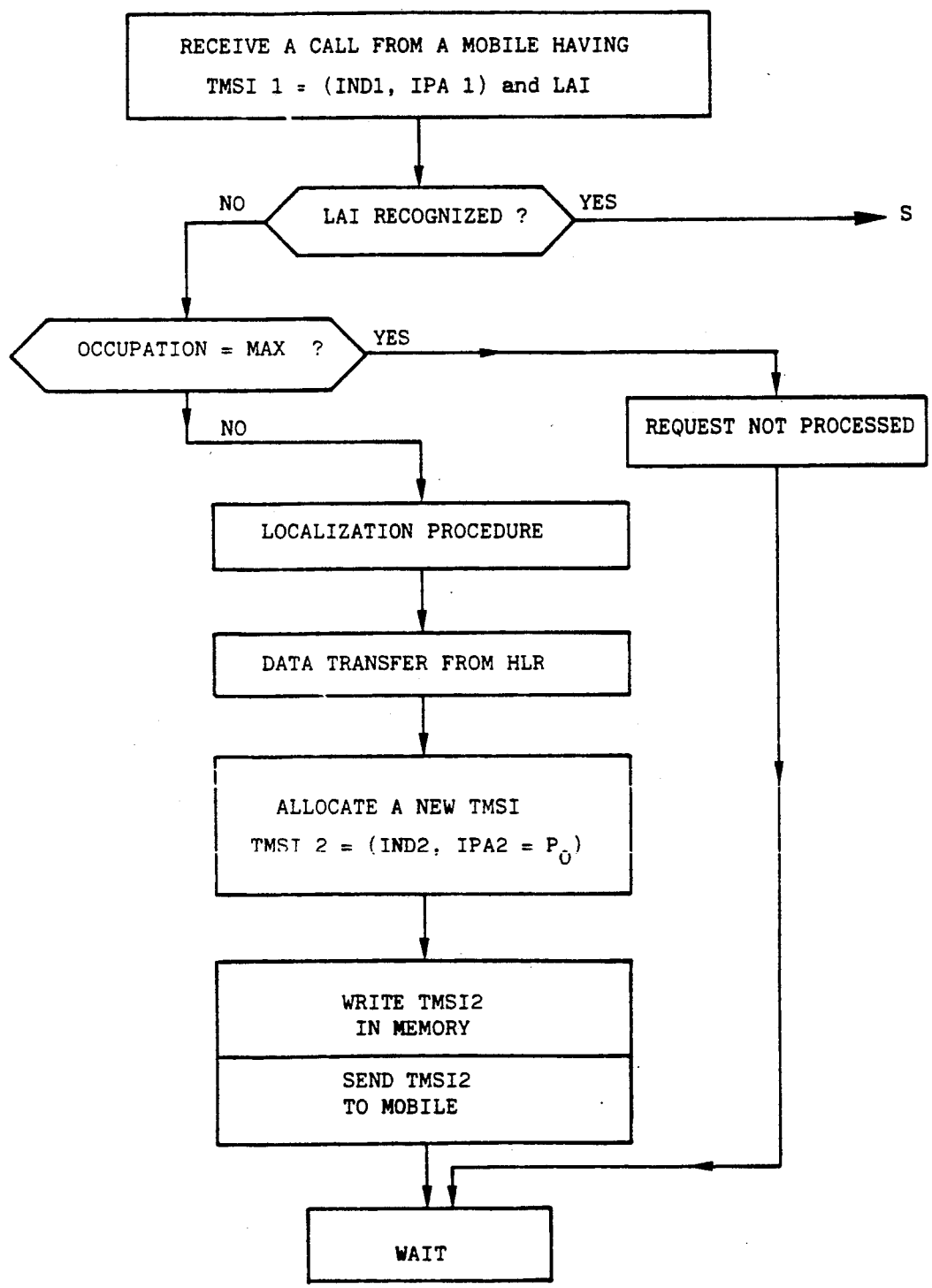
FIGS. 6A and 6B are a flow chart showing one way in which the method of the invention may be implemented to "refresh" the temporary identity of a mobile when the visitor location register receives a call for said mobile.
Figure 6B:
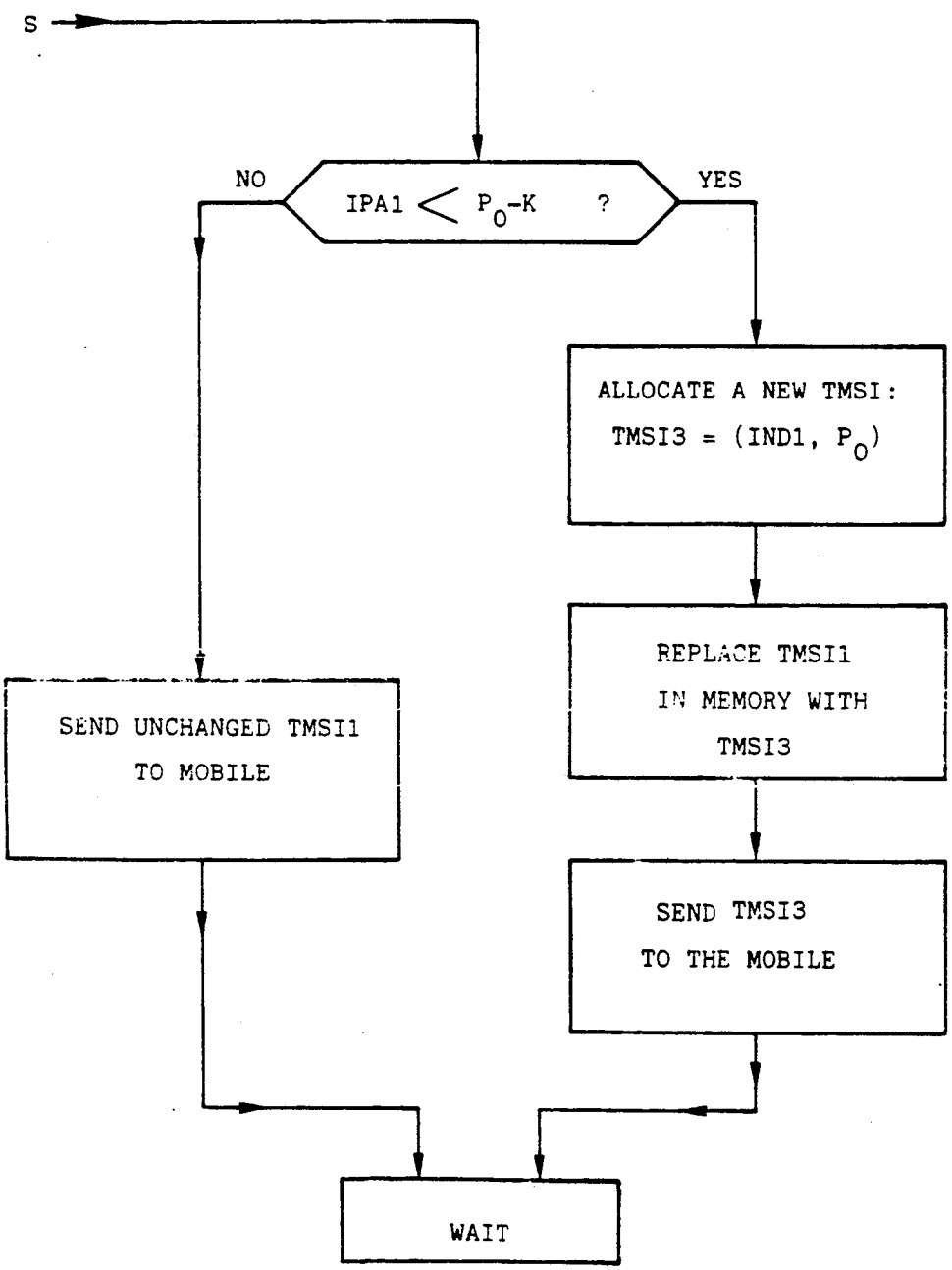

FIGS. 6A and 6B are a flow chart showing one example of how the method of the invention may be implemented to allocate a temporary identity to a mobile which requires attention in one of the zones corresponding to the register under consideration, and more particularly for "refreshing" the temporary identity of a mobile which has already had at least one connection with the register under consideration.

This procedure begins on receiving a call from a mobile, either because of a change of zone and the subscribed desires to trigger a "localization" procedure for informing the system of the mobile's new location, or else because the mobile is seeking to establish a call after having already required attention in the same zone. The call from the mobile includes, in particular, the temporary identity TMSI1 previously allocated thereto and a zone number LAI designating the last zone in which the mobile was localized by the system.

The procedure begins by comparing the zone number sent by the mobile with the numbers of the zones that correspond to the register under consideration. If the zone number is not recognized, then the mobile has come from a zone which the register does not serve and consequently a TMSI must be allocated. The procedure then consists in comparing the memory occupation value with the maximum. If the memory is already fully occupied, then mobile in-booking is refused since the mobile's request for localization cannot be processed. If the memory is not fully occupied, then the mobile localization procedure is implemented.

In outline, the register informs the HLR (from which it deduces the address of the mobile's IMSI) of the address of the new VLR controlling the mobile. The home location register HLR responds by transmitting to the visitor location register such mobile data as it requires for controlling the mobiles calls. In addition, the home location register informs the visitor location register from which the mobile previously depended that it may erase the mobile from its memory. The localization procedure then consists in allocating a new temporary identity to the mobile: TMSI2=(IND2, IPA2), where IND2 corresponds to a free n-tuplet in the VLR data base and where IPA2 is equal to $P_0$ which at the instant under consideration is the value to be attributed to the time mark.

The procedure then consists in storing the temporary identity TMSI2 in an n-tuplet whose number is contained in IND2. Finally, the procedure consists in sending its new temporary identity TMSI2 to the mobile, after which the procedure waits for a further call.

FIG. 6B shows a portion of the flow chart for processing the case (referenced S) in which the zone number sent by the mobile subscribed is equal to the number of one of the zones served by the VLR under consideration. If the mobile has changed zones relative to the zone it occupied last time it was involved in the localization procedure, then the register must store the new zone number in the place of the old zone number while also "refreshing" the identity of the mobile. The procedure consists in comparing the time mark value IPA1 of the previous identity attributed to the mobile with a threshold value $P_0-K$ modulo $2^{15}$. If the time mark IPA1 lies in the range $P_0$ to $P_0-K$, modulo $2^{15}$, then the temporary identity TMSI1 remains unchanged since it was allocated recently.

K is a constant whose value may be zero. It is preferably chosen to be equal to a few units. The constant K serves to keep each temporary identity unchanged for K periods so as to avoid pointlessly frequent refreshing operations. The procedure then consists in sending a new temporary identity to the mobile, which new temporary identity is in fact constituted by the previous temporary identity TMSI1, without any change, after which the procedure consists in waiting for a new call.

If the time mark IPA1 does not lie in the range $P_0$ to $P_0-K$ modulo $2^{15}$, that means that the temporary identity of the mobile is not recent and that it must be "refreshed", however that does not mean that the mobile data in the data base needs changing. The procedure thus consists in allocating a new temporary identity TMSI3 in which the first field IND1 remains unchanged and in which the second field IPA contains the value $P_0$ to be given at the moment under consideration to the time mark of any new temporary identity. The procedure then consists in updating the value of the time mark in the data base; after which the new temporary identity is sent to the mobile; after which the procedure waits for a new call.

The advantage of the chosen structure for the temporary identity can be seen from the above-described procedures: when a mobile makes itself known by means of its TMSI, the IND field gives quick access to the corresponding data in the data base, while the IPA field, which is distinct from the IND field, serves to allocate a new value to the TMSI without changing the IND field, thereby maintaining fast access to the data without there being any need to move the data in the data base.

Since the calling mobile transmits its time mark value to the VLR, the VLR is in a position to detect an anomaly whenever the n-tuplet of the mobile has been reused for a different mobile, under the circumstances mentioned above.

When a temporary identity word is allocated to a mobile, this word is transmitted to the mobile and the mobile responds with an acknowledgement. If the register does not receive the acknowledgement, then it does not know whether the temporary identity word has been received by the mobile. Nevertheless, the register stores the new identity to replace the old.

The register then assumes that this temporary identity word will be acceptable for identifying the mobile in contacts triggered at the initiative of the mobile. In contrast, if the register itself seeks to make contact with the mobile in question, then it will make use of the international identity which is a permanent characteristic of the mobile. Consider the case where the mobile has not received its new temporary identity. If the new temporary identity was allocated by the register under consideration, which serves the zone containing the mobile at the instant under consideration, and if the mobile requests attention by using its old temporary identity, then the register will not recognize it since it has been erased. It will therefore ask the mobile for its international identity and will then give the mobile a temporary identity which is different from the temporary identity that was not received.

The procedure of the invention can be implemented by means of a real time data management system running on a conventional type of multiprocessor system as is conventionally used for managing a cellular radiotelephone system, with the visitor location register then constituting merely one of the functional portions of such a management system. For example, the multiprocessor system may be the Alcatel 8300 system as sold by Alcatel CIT. The programming of such a multiprocessor system to implement the method of the invention lies within the competence of the person skilled in the art.

We claim:

1. In a cellular radiotelephone system, a method of protecting the data base of a visitor location register from saturation, the method comprising the steps of:
    allocating a temporary mobile identity word to each mobile that announces its presence for the first time in a geographical zone served by the register, said word comprising a first field specifying an internal reference for an n-tuplet in a table of the data base, and a second field which is a function of the instant at which the temporary identify word is allocated;
    writing each temporary identity word in the n-tuplet designated by its first field;
    releasing said n-tuplet when the mobile demonstrates its presence in a zone corresponding to another register;
    allocating a new temporary identify word to a mobile each time said mobile again announces its presence in a zone served by the register after a silence of duration greater than a threshold value, with the first field thereof remaining unchanged while the second field thereof being a function of the instant at which the mobile again announces its presence;

writing the new temporary identity word in the n-tuplet designated by the first field; and periodically releasing from the data base those n-tuplets which correspond to temporary identify words whose second fields correspond to instants earlier than a first threshold instant;

the method being characterized in that it further comprises, whenever the data base is filled close to saturation, in releasing n-tuplets from the data base corresponding to temporary identify words whose second fields correspond to instants earlier than a second threshold instant which is more recent than the first threshold instant.

2. A method according to claim 1, characterized in that in order to allocate a temporary identify word including a second field which is a function of the instant at which the temporary identity word is allocated, the method comprises in giving the second field the result $P_0$ of counting time periods modulo a fixed number; and in taking a counting cycle for which the duration between two successive passes through zero of said result exceeds the maximum probable duration of silence from a mobile.

3. A method according to claim 2, characterized in that in order to allocate a temporary identify word including a second field which is a function of the instant at which the temporary identity word is allocated, the method further comprises saving the result of the count and in incrementing it by unity each time the visitor location register suffers an accident causing its memory to be erased fully or in part.

4. A method according to claim 1, characterized in that in order to allocate a temporary identity word including a second field which is a function of the instant at which the temporary identity is allocated, the method comprises making up the second field from:

a first binary word whose value is the result of counting time periods modulo a fixed number, with the duration of the counting cycle between two successive passes through zero of said result being selected to be greater than the maximum possible duration of silence form a mobile; and a second binary word whose value is incremented by unity each time the visitor location register suffers an accident causing its memory to be erased totally or in part.

5. A method according to claim 2, characterized in that it further comprises taking time periods that are generally of fixed duration.

6. A method according to claim 2, characterized, in that it comprises taking time periods constituted by time intervals such that within each time interval there is a predetermined maximum number of temporary identities allocated to mobiles announcing their presence.

* * * * *